Dec. 18, 1962

C. POUGET 3,068,554

MAGNETIC CORE MEMORY MAKING PROCESS

Filed Nov. 22, 1957

INVENTOR
CLAUDE POUGET

BY
William J Schelberg
AGENT

United States Patent Office 3,068,554

Patented Dec. 18, 1962

3,068,554
MAGNETIC CORE MEMORY MAKING PROCESS

Claude Pouget, Paris, France, assignor to International Business Machines Corporation, New York, N.Y., a corporation of New York Filed Nov. 22, 1957, Ser. No. 698,164
Claims priority, application France Dec. 21, 1956
3 Claims. (Cl. 29—155.5)

This invention relates to automatic manufacturing of magnetic core circuitry in combination with printed circuitry techniques and more particularly to the automatic manufacturing of magnetic core memory arrays.

In the few years since the use of square hysteresis loop magnetic cores in memory devices was proposed, the magnetic-core memory has established itself as a very attractive device for digital computers. Among its virtues are excellent reliability, capability of high-speed operation, and possibility of large storage capacity in compact size. As digital computers are constructed to handle more complex problems the storage capacity is accordingly, in many instances, increased and automatic assembly of magnetic core storage planes becomes highly desirable to decrease cost and increase production rates.

The prior art is exemplified by Patent No. 2,700,150 which describes how memory planes of magnetic cores may be automatically achieved. Briefly, in the aforementioned patent, a first sub-assembly is provided made up of a plastic plug bearing U-shaped wires which are inserted into the central apertures of the toroid. An insulating plate having printed circuitry thereon with appropriately spaced holes is further provided as a second sub-assembly. The two sub-assemblies are then automatically put together by inserting the first sub-assembly into the appropriate holes in the second sub-assembly. The reverse side of the insulating plate is then dipped into a bath of molten solder so as to draw the solder, by capillary action, up the annular space between the ends of the U-shaped wires and the holes in the plate. If we assume both sub-assemblies were, in turn, automatically assembled for the final stage described, various difficulties are encountered. The core, which is small in structure, must be handled while the plug is inserted and again when the first sub-assembly bearing the core is inserted into the plate. Since the cores are relatively delicate, too much handling, as described above, increases the frequency of breakage. Further, when the final assembly is dipped into the bath of molten solder, the cores are exposed to high temperatures which in some instances, changes its rectangular characteristics.

In a copending application, Serial No. 507,229, filed May 10, 1955, on behalf of Paul V. Horton, now Patent No. 2,970,296, issued January 31, 1961, and assigned to the same assignee, a memory plane is manufactured by imbedding the cores in an insulating plate, then printing the circuits on both faces of the plate and performing connections between the circuits during the process of copper-plating as a part of the printing operation. In this latter application, circuits are then provided on both surfaces of the plate which can only be achieved after the setting of the cores. Here again, the cores are subjected to heat treatment during the printing step. A further objection is that after assembly of the memory plane, if a core is broken or has changed its characteristics substantially, the whole plate must be scraped, therefore, leaving no room for modification.

Accordingly, it is a broad object of this invention to provide a simple means of manufacturing magnetic core circuits.

A more specific object of this invention is to provide a new and improved method of manufacturing magnetic core memory planes.

In accordance with the foregoing objects, a method of assembly is achieved which avoids the difficulties encountered with assembly techniques as set forth in the aforementioned patent and application. This is accomplished by providing an insulating plate having perforations therethrough, the upper part of which is recessed having cores seated therein and having printed conductive areas on the reverse side thereof. The method of manufacture using the foregoing component consists in first placing staples upon the upper face of the plate with their branches traversing and applied against the walls of the perforations, second, bending the ends of the staples back against the reverse side of the plate and soldering them to the printed circuits.

Other objects of the invention will be pointed out in the following description and claims and illustrated in the accompanying drawings which disclose, by way of example, the principle of the invention and the best mode, which has been contemplated, of applying that principle.

Figure 1:
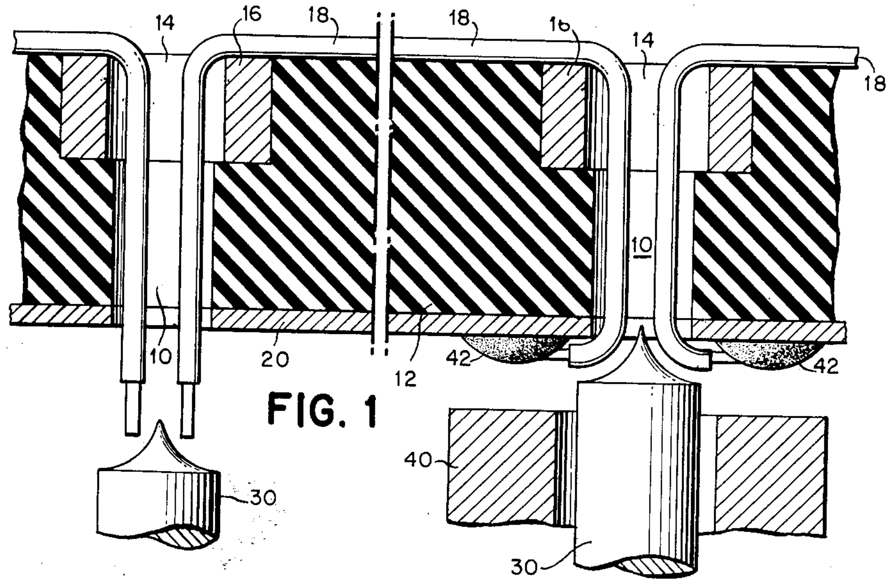
FIG. 1 represents a cross-sectional part of a plate in accordance with the invention.

In the FIG. 1, perforations 10 in an insulating plate 12 are provided with an upper section 14 in which a core 16 is to be recessed. The diameter of the section 14 is equal to, or slightly greater than, the outside diameter of the core 16, while the depth of the recess 14 is equal to, or slightly greater than, the height of the core 16. A plurality of insulated wire staples 18 is shown, each traversing the perforations 10 and having their ends pointed downward. A printed circuit 20 is provided on the face opposite the recess 14 to which the staples 18 are to be soldered.

Initially, the cores 16 are placed upon the plate 12 and seated in the recess 14 by imparting vibrations to the plate 12 as described in the aforementioned Patent No. 2,970,296 and the excess cores are recovered by tilting. The ends of the staples 18 are stripped with acid, and then tinned. The staples 18 are then automatically placed upon the upper face of the plate 12 with their branches traversing the perforations 10 and the cores 16, and applied against the walls of the perforations 10. The ends of the staples 18 are then bent back against the lower face of the plate 12 which is achieved automatically by the use of a conical matting tool 30, driven between the ends of staples 18. On the left is shown the ends of the staples 18 before bending, while on the right, their position after bending. The position taken by the tool 30 is represented in each case as shown, however, it is understood that all tools work simultaneously.

The ends of the staple 18 are then soldered to the printed circuits 20 by a toroid plane soldering iron 40, leaving a solder spot 42, which soldering operation is preferably performed before the matting tool 30 has been removed. The soldering iron 40 and the bending tool 30 may be formed as a unitary structure whereby the bending of the staple ends and the soldering thereof to the printed circuits is accomplished by a single movement of the combined tool. The assembly then receives a suitable protective coating insuring insulation and preventing any subsequent displacement of cores with respect to the plate.

Figure 2:
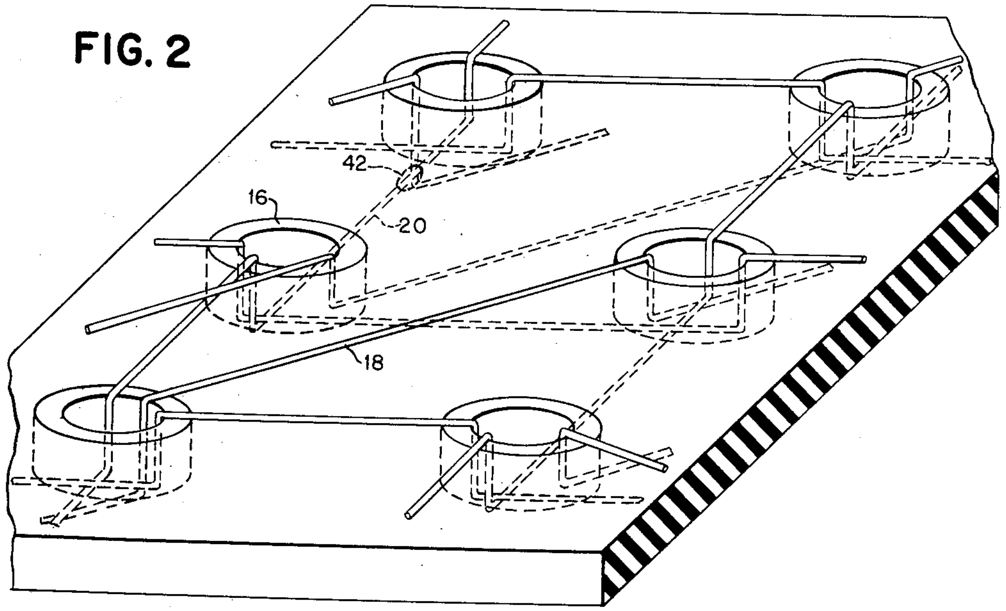
FIG. 2 is a schematic representation of a core array assembled in accordance with the invention.

Thus, it is possible to achieve combinations of various circuits and particularly as shown in the FIG. 2 which depicts an assembly comprising a row and column selection with a read circuit. Replacing a broken core may be rapidly accomplished by unsoldering and removing the staples which traverse the recesses 14 and perforations 10 and removing and replacing the undesired core with a subsequent resoldering and restoration of the protective coating.

If necessary, it is possible to provide in the plate 12, in addition to the holes meant for lodging the cores, holes only meant for passing the staples to provide automatic assembly of other core circuit arrangements.

Although a preferred mode of achievement of the invention has been described, it should be understood that various omissions, substitutions, and modifications may be made by those skilled in the art without departing from the spirit of the invention. It is the intention therefore, to be limited only as indicated by the following claims:

What is claimed is:

1. A method of fabricating a magnetic core circuit comprising the steps of taking an apertured panel having recesses on one side surrounding said apertures and adapted to receive magnetic cores flush with the surface of said panel, said panel having printed conductors on the opposite side, arranging apertured cores in said recesses in alignment with said panel apertures, inserting conductors in the form of staples through said aligned apertures of said cores and said panel from said one side, and connecting the ends of said staples to said printed conductors.

2. A method of fabricating a magnetic core circuit comprising the steps of taking an apertured panel having recesses on one side surrounding said apertures and adapted to receive magnetic cores flush with the surface of said panel, said panel having printed conductors on the opposite side, arranging apertured cores in said recesses in alignment with said panel apertures, inserting conductors in the form of staples through said aligned apertures in said cores and said panel from said one side, applying a tool to bend the ends of said staples into contact with said printed conductors, and applying a soldering tool to solder said staple ends to said printed conductors.

3. The invention of claim 2 wherein said bending tool and said soldering tool are formed as a unitary structure, said bending tool being formed as a curved surface of revolution whereby it is effective in all radial directions in a plane parallel to said panel for bending said staple ends, and said soldering tool being formed as a toroid surrounding said bending tool and having a plane soldering surface parallel to said panel.

References Cited in the file of this patent

UNITED STATES PATENTS

| | | |
|---|---|---|
| 2,651,833 | Kernahan | Sept. 15, 1953 |
| 2,676,392 | Buhrendorf | Apr. 27, 1954 |
| 2,694,249 | Kapp | Nov. 16, 1954 |
| 2,700,150 | Wales | Jan. 18, 1955 |
| 2,724,103 | Ashenhurst | Nov. 15, 1955 |
| 2,777,192 | Albright et al. | Jan. 15, 1957 |